(12) United States Patent
Searfoss

(10) Patent No.: US 8,465,080 B2
(45) Date of Patent: Jun. 18, 2013

(54) SLIDING PIVOT ASSEMBLY FOR COVER SYSTEMS

(75) Inventor: Timothy K. Searfoss, West Branch, MI (US)

(73) Assignee: Roll-Rite, LLC, Alger, MI (US)

( * ) Notice: Subject to any disclaimer, the term of this patent is extended or adjusted under 35 U.S.C. 154(b) by 212 days.

(21) Appl. No.: 13/047,285

(22) Filed: Mar. 14, 2011

(65) Prior Publication Data

US 2012/0235440 A1    Sep. 20, 2012

(51) Int. Cl.
*B60P 7/04* (2006.01)

(52) U.S. Cl.
USPC ........................................ 296/100.18; 296/98

(58) Field of Classification Search
USPC ............ 296/98, 101, 100.11, 100.12, 100.15, 296/100.18
See application file for complete search history.

(56) References Cited

U.S. PATENT DOCUMENTS

| | | | |
|---|---|---|---|
| 3,868,142 A | 2/1975 | Bachand et al. | |
| 4,874,196 A | 10/1989 | Goldstein et al. | |
| 5,031,955 A | 7/1991 | Searfoss | |
| 5,076,174 A | 12/1991 | Martin | |
| 5,094,499 A | 3/1992 | Simone, Jr. | |
| 5,125,713 A | 6/1992 | Willingham et al. | |
| 5,129,698 A | 7/1992 | Cohrs et al. | |
| 5,174,625 A | 12/1992 | Gothler et al. | |
| 5,211,440 A | 5/1993 | Cramaro | |
| 5,218,743 A | 6/1993 | Miller | |
| 5,238,287 A | 8/1993 | Haddad, Jr. | |
| 5,240,304 A | 8/1993 | Cramaro et al. | |
| 5,292,169 A | 3/1994 | O'Brian | |
| 5,328,228 A | 7/1994 | Klassen | |
| 5,330,246 A | 7/1994 | Bernardo | |
| 5,340,187 A | 8/1994 | Haddad, Jr. | |
| 5,524,953 A | 6/1996 | Shaer | |
| 5,697,663 A | 12/1997 | Chenowth | |
| 5,713,712 A | 2/1998 | McIntyre | |
| 5,752,735 A | 5/1998 | Fleming et al. | |
| 5,829,818 A | 11/1998 | O'Daniel | |
| 5,829,819 A | 11/1998 | Searfoss | |
| 5,887,937 A | 3/1999 | Searfoss | |
| 5,944,374 A * | 8/1999 | Searfoss | 296/100.14 |
| 6,257,646 B1 | 7/2001 | Searfoss | |
| 6,659,531 B2 | 12/2003 | Searfoss | |
| 6,988,758 B1 * | 1/2006 | Talbot | 296/100.18 |

(Continued)

FOREIGN PATENT DOCUMENTS

WO    WO 01/70532    9/2001

OTHER PUBLICATIONS

Search and Examination Report dated Jun. 21, 2012, issued by the United Kingdom Intellectual Property Office for Application No. GB1203549.9.

(Continued)

*Primary Examiner* — Jason S Morrow
(74) *Attorney, Agent, or Firm* — Miller, Canfield, Paddock and Stone, P.L.C.; Timothy J. Engling

(57) ABSTRACT

A covering system for vehicles and trailers having a narrow pivot assembly with a moveable arm to help deploy the covering system. The pivot assembly has a gear assembly combined with a spring assembly having the power of multiple springs, which are preferably spiral torsion springs, regarding movement of the arm. The pivot assembly may in turn be mounted in a sliding mechanism for covering various heights of detachable containers.

20 Claims, 10 Drawing Sheets

U.S. PATENT DOCUMENTS

| | | |
|---|---|---|
| 7,111,891 B2 * | 9/2006 | O'Brian et al. ............... 296/98 |
| 7,594,687 B2 | 9/2009 | Searfoss |
| 8,061,759 B2 * | 11/2011 | Conner .................. 296/100.14 |
| 8,272,676 B2 * | 9/2012 | Bremer ......................... 296/98 |
| 2002/0145304 A1 * | 10/2002 | Henning ....................... 296/98 |
| 2007/0102951 A1 * | 5/2007 | Chenowth ..................... 296/98 |
| 2007/0222253 A1 * | 9/2007 | Wood et al. .................. 296/98 |
| 2011/0298242 A1 * | 12/2011 | Schmeichel .................. 296/98 |
| 2012/0104788 A1 | 5/2012 | Prince |
| 2012/0187712 A1 * | 7/2012 | Bromberek ................... 296/98 |

OTHER PUBLICATIONS

Pioneer, a Wastequip Company, Refuse Tarping System—RP4500SAR publication, www.pioneercoverall.com, printed Feb. 18, 2011. (admitted prior art).

Pioneer, "You'll Feel the Difference of Rack 'n Pinion Technology!," Pioneer publication, undated (admitted prior art).

* cited by examiner

SLIDING PIVOT ASSEMBLY FOR COVER SYSTEMS

FIELD OF THE DISCLOSURE

This disclosure relates to covering systems for trailers and containers. More specifically, the disclosure relates to a narrow pivot assembly with an arm to help deploy the covering system.

BACKGROUND

Railcars and trucks or cabs having trailers can have open-top trailers or containers, for which the contents may want to be protected from the environment or local regulations may require to be covered while transporting such contents of the container. Many truck trailers and rail cars, particularly those hauling loose loads, such as sand and gravel, need a cover to prevent the wind from blowing contents from the container. Trucks and rail cars having open-top container cars may have covering systems. Thus, open-top containers often have tarp systems to cover the contents. Tarps are well known for covering contents of a container of the trailers and railcars during transport. Tarp covering systems are preferably automated to cover trailers or containers while transporting contents of the container. But size limitations and effectiveness must be maximized for covering systems.

U.S. Pat. No. 6,257,646, the disclosure of which is incorporated by reference, discloses an apparatus 10 including a sliding pivot for moving a cover over a bed 12 of a truck 14. The apparatus 10 comprises a pair of rails 16, a pair of bows 18 and a pair of cylinders 20. Each bow 18 has a first end connected to a cover and a second end connected to a follower adjustable along an associated rail. The cylinders are connected to an associated follower, and develop a force along a plane defined by the rails to slide the followers along the rails. The bows are slideable and pivotable to move the cover over the bed of the truck from a retracted position proximate a front end of the bed to an extended position proximate a rear end of the bed. The lower end 40 of the bow 18 pivotably cooperates with an outer rail 36 via a hinge 44 as described in U.S. Pat. No. 5,887,937. The pivot mounting apparatus may include a housing, a pivot assembly, a locator pin, and at least one spiral torsion spring. The springs are in the housing and engage or otherwise cooperate with the locator pin and axial groove in a shaft to bias the pivot assembly toward a home position. A hydraulic circuit used with cylinders with pistons and valves are disclosed in U.S. Pat. No. 6,659,531. A raiseable tower 22 is preferably also included. Since these patents, truck frames and fenders have become wider to limit the available space outside of the fender.

Intermediate mounting between the fender and container of a truck was possible, but narrower components are now needed.

Various other apparatus have been devised for covering a trailer load. Some such apparatus particular for container trucks, such as for the waste market, include a motor for selectively winding a flexible cover. An effective cover should be one that is easily operated so as to selectively cover and uncover the load from the convenient location of the truck cab. U.S. Pat. No. 5,031,955 provides a truck cover that may be conveniently motor operated from the cab of a truck to extend the cover from a winding assembly proximate the front of the truck bed and toward the rear of the truck bed. The truck cover assembly 20 includes a flexible cover 22, a winding assembly 24 for winding and storing a cover 22, an extension assembly 26 for extending a cover 22 over load bed 14, and a tension assembly 28 for applying a downward force on cover 22 proximate front end 16 of load bed 14.

Another refuse tarping system is RP4500SAR of Pioneer, a Wastequip company. It includes telescoping low arms, but it uses a rack and pinion system. This rack and pinion system may be installed on a two-and-a-half inch square tube mounted to the side of a truck. With a rack mounted with teeth facing up, debris can get jammed between the rack and pinion. A wedged stone can lock up a rack and pinion system. Typically, such a system is hydraulically driven in both directions. Other tarping systems may use concentric springs to bias a system in one direction.

Within the context of container truck cover systems, the tarping system must operate within strict dimensions. For example, a knuckle, rack and pinion, or pivot assembly may have to operate in a width that is only three inches wide. A maximum fender width and container width allowed by U.S. regulations is 102 inches. The maximum width allowed for a tarping system is 108 inches, which leaves three inches per side that may be unobstructed for the covering system to mount and operate.

SUMMARY

The present disclosure provides a covering system using a gear-driven pivot assembly to get maximum spring power from a spring assembly in a narrow width. The pivot assembly has a gear assembly combined with a spring assembly having the power of multiple aligned springs. This pivot assembly can mount and operate within the three-inch width available per side of a truck fender or container. The pivot system preferably includes a sliding pivot assembly when welded or bolted to a sliding mechanism as ideal for a waste container truck in the waste market.

The covering system has a cover movable between an opened position and a closed position that is assisted by an arm or arms including one that pivots. The covering system has a narrow pivot assembly comprising a gear assembly and a coordinated spring assembly with a primary gear and a primary spring engaging a primary rotating shaft for coordinated movement and a secondary gear and a second spring engaging a second rotating shaft for coordinated movement. The primary gear transmits torque to one or more secondary gears as part of the gear assembly. An arm is fixed relative to the primary gear or otherwise secured relative to the primary shaft for pivoting about the primary shaft as the primary gear moves.

An example of a benefit is obtaining the power of a six-spring system in a width that is only three inches wide, which is typical for two side-by-side springs. This addresses a need for powerful, lightweight and narrow pivoting assembly that fits within the maximum allowed width for a tarping system of 108 inches, as within three inches per side, with a truck fender width or outside container width of 102 inches. Per this example, the pivot assembly allows the power of six springs in the same space traditionally needed for two springs. In this example, the power of a previously eight-inch pivot assembly is obtainable in a narrower three-inch-wide assembly by aligning three springs in two side-by-side sets.

BRIEF DESCRIPTION OF THE DRAWINGS

The above-mentioned and other features of this disclosure and the manner of obtaining them will become more apparent, and the disclosure itself will be best understood by reference to the following descriptions of assemblies and systems taken in conjunction with the accompanying figures, which are given as non-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, and herein described in detail, embodiments with the understanding that the present descriptions are to be considered exemplifications of the principles of the disclosure and are not intended to be exhaustive or to limit the disclosure to the details of construction and the arrangements of components set forth in the following description or shown in the figures.

Figure 1:
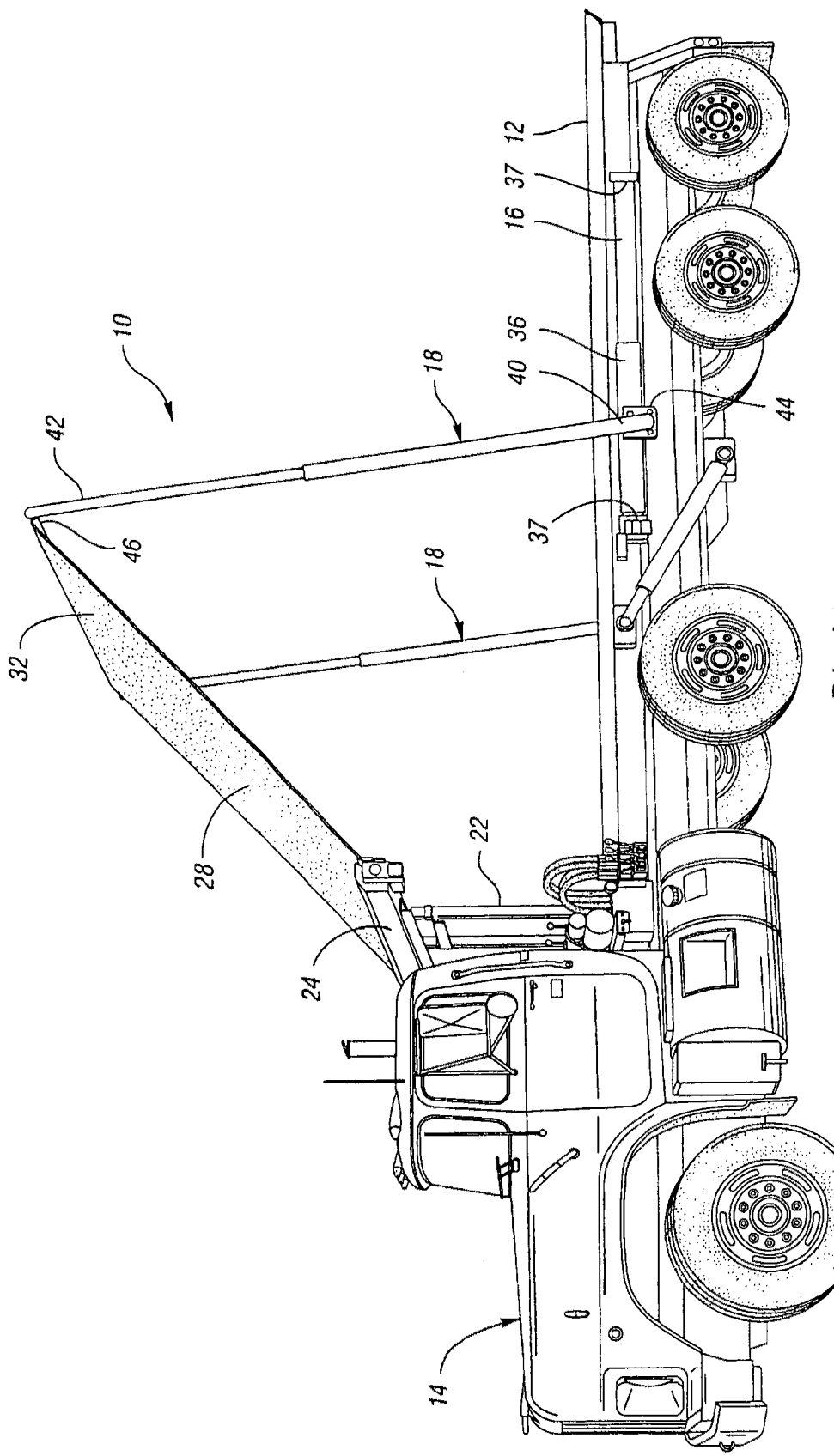
FIG. 1 shows a perspective view of a truck with an apparatus in an intermediate position from U.S. Pat. No. 6,257, 646.

Covering systems for vehicles and trailers are known to use motors to pull tarps over trailers or containers. The covering system has a cover movable between an opened position and a closed position. An assembly and motor, such as shown in U.S. Pat. No. 5,829,819, can drive arms to the front, and a pivot system or hinge can force the arm back. A cover system can be biased toward a home position, such as deployed, with a motor driving the system in the opposite way, such as to overcome bias for the tarp to wind or roll back up. As shown in U.S. Pat. No. 6,257,646, various movable arms can operate with a pivot mounting knuckle or hinge 44 per prior art FIG. 1. Certain components of this operating system can be used with a new configuration of a narrower pivot assembly.

Figure 2:
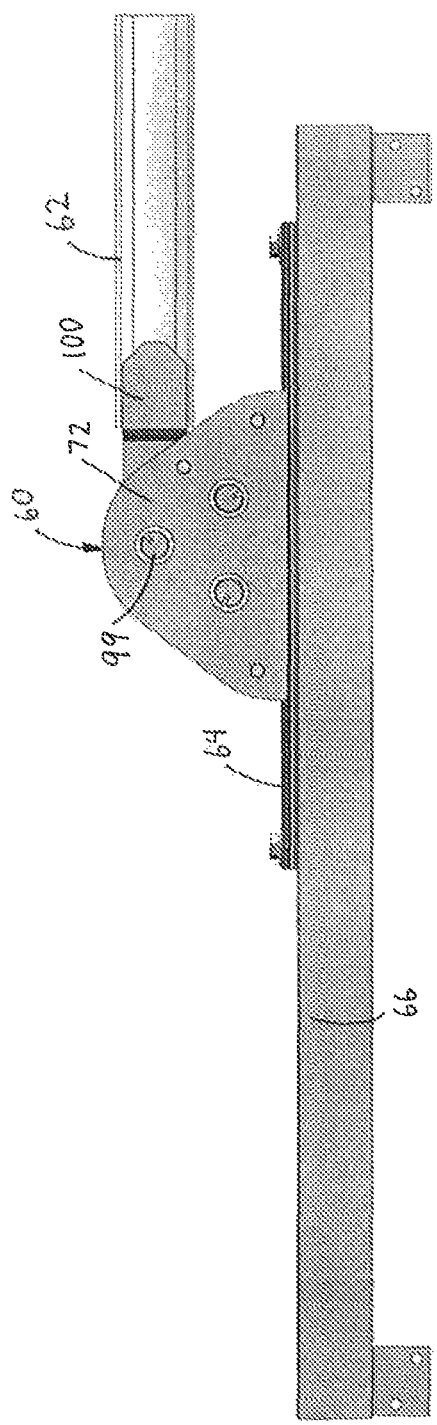
FIG. 2 shows a side view of a sliding pivot system.
Figure 10:
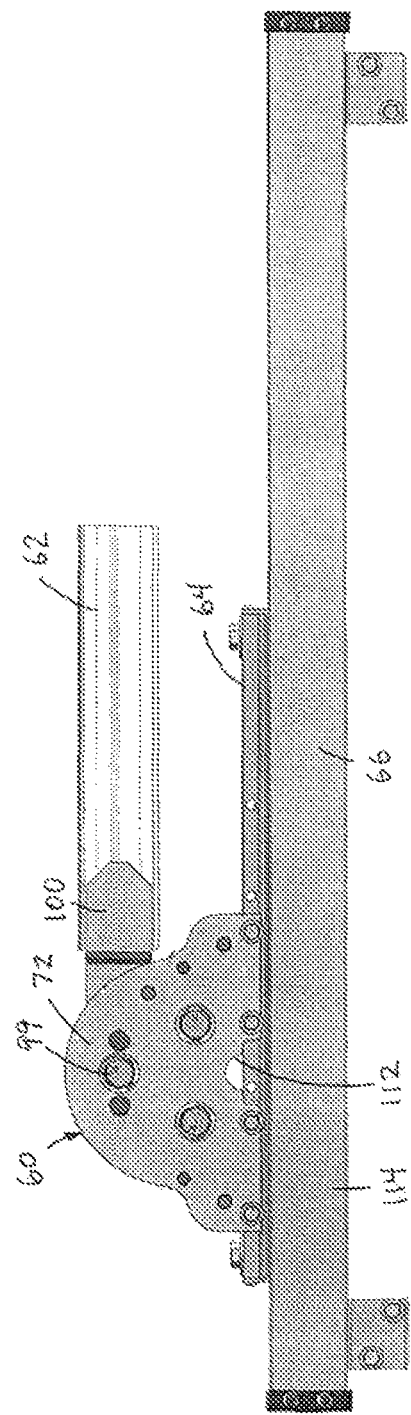
FIG. 10 shows a side view of a sliding pivot system slid to the aft position.

As shown in FIGS. 2 and 10, a gear-driven, preloaded spring-biased pivot assembly 60 allows an arm 62 to be pivotably mounted relative to a base 64, such as a flat platform. The arm 62 can help operate a covering system. Preferably, the base 64 in turn is slideably mounted in a guide 66 or other sliding mechanism so that the arm 62 is pivotably and slideably mounted relative to the guide 66. The base 64 with the pivot assembly 60 can be welded or bolted to be a sliding pivot assembly, which may have a cylinder 68 or similar piston device within the guide 66 or may otherwise cooperate with an end 70 to limit that travel of the base 64 relative to the guide 66. This combined sliding and pivoting assembly may be installed on or as a two-and-a-half inch square tube mounted to the side of a truck as part of a powerful, lightweight and narrow pivot assembly that fits within the maximum allowed width for a tarping system of 108 inches, within three inches of unobstructed area per side, with a truck fender width or outside container width of 102 inches. A narrow sliding pivot system is desirable for covering systems for container trucks in the waste market, such as for use with different heights and sizes of detachable containers.

The pivot assembly 60 is substantially between two plates 72 and 73 with a gear assembly 74 mounted in conjunction with a primary shaft 78 and one or more secondary shafts 79. As shown, the primary shaft 78 operates in conjunction with two secondary shafts 79 that rotate. While plates 72 and 73 are shown as preferred rigid, thin bodies of substantially uniform thickness that are thin and flat, the term "plate" need not necessarily be flat or uniform thickness. With the base 64, the plates 72 and 73 may form a housing as part of the pivot assembly 60.

The gear assembly 74 includes a primary gear 80 mounted on the primary shaft 78 and one or more secondary gears 81 mounted on a respective secondary shaft 79. Each gear 80 and 81 may include an inner tab or knob 82 that engages or otherwise functionally fits in an axial groove 84 so that when the shafts 78 or 79 rotate than gears 80 and 81 also rotate. The gears 80 and 81 are oriented so that the teeth 86 of each gear transmit motion and/or torque to an adjacent toothed gear and its respective rotatable, resiliently-biased shaft. The gear assembly 74 is functionally connected to a spring assembly 76 via rotatable shafts 78 and 79.

The spring assembly 76 preferably includes a series of spiral torsion springs 88 and 89 including a primary spiral torsion spring 88 and secondary spiral torsion springs 89 that are aligned within the width of one spring. The springs 88 and 89 include inner hooks 90 and 91 respectively that engage or are secured in the respective shaft 78 and 79. The outer hooks 92 and 93 of springs 88 and 89 cooperate with and can be fixed on a primary pin 94 and secondary pin 95 respectively. The outer ends of the springs 88 and 89 are shown with hooks 92 and 93, but as readily understood the end could be a looped hook that completely surround a pin 94 or 95 that are fixed relative to the plates 72 and 73. The pins 94 and 95 may pass through each plate 72 and 73 to secure the pins 94 and 95 in a stable position, preferably substantially parallel to shafts 78 and 79.

The primary gear 80 and the primary spring 88 engage or are otherwise attached to the primary rotating shaft 78 in the middle for coordinated movement. A secondary gear 81 and a secondary spring 89 engage or are otherwise attached to a second rotating shaft 79 for coordinated movement. The primary gear 80 transmits torque to the secondary gear 81 as part of the gear assembly 74 with combined torque based on the power of multiple aligned springs 88 and 89.

The shafts 78 and 79 extend though each plate 72 and 73 with associated bushings 96, inserts 97, and caps 98 (such as polymer bearings) to help secure the shafts 78 and 79 and reduce wear of the gear assembly 74 and spring assembly 76. The primary shaft 78 preferably has an end 99 passing through each plate 72 and 73 that allows the shaft 78 to rotate relative to the plates 72 and 73, and the primary shaft 78 passes through the middle of the primary gear 80 and spiral torsion spring 88 with the axial groove 84 of the primary shaft 78 being engaged and cooperating with the tab 82 of the gear 80 and the inner hook 90 of the spiral torsion spring 88. The secondary shaft or shafts 79 also preferably pass through each plate 72 and 73 and correspondingly pass through the middle of the secondary gear 81 and secondary spiral torsion spring 89 with the axial groove 84 of the secondary shaft 79 being engaged and cooperating with the tab 82 of the secondary gear 81 and the inner hook 91 of the secondary spiral torsion spring 89. As shown, a third shaft 79 has an associated gear 81 and spring 89.

Figure 3:
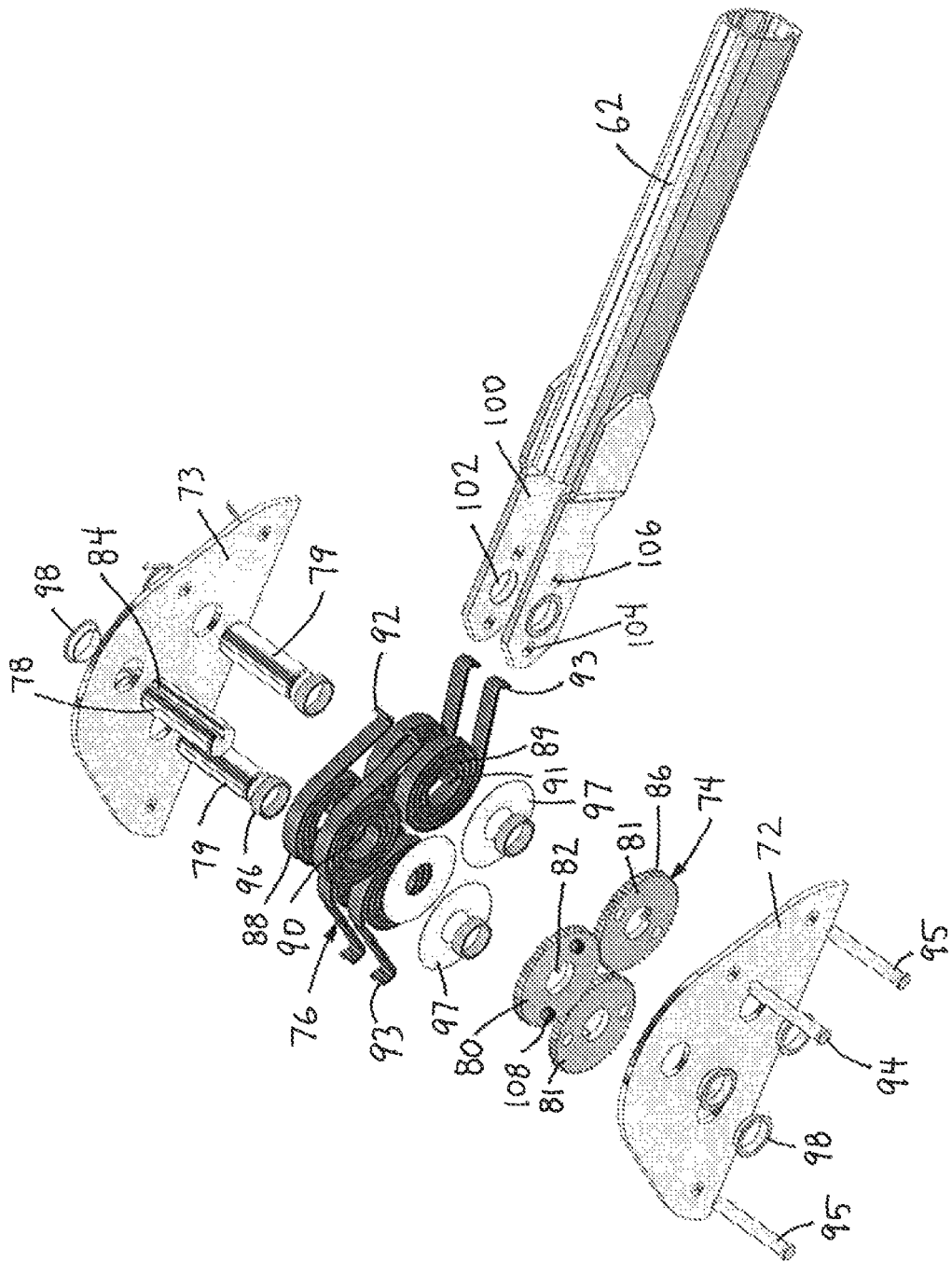
FIG. 3 shows an exploded view of a pivot assembly.

The arm 62 may include a bracket 100 with an aperture 102 (through which the primary shaft 78 passes) or other means to connect to the primary shaft 78. The bracket 100 has fasteners or fixation means to secure the arm 62 relative to the primary shaft 78. As shown in FIG. 3, the bracket 100 may include fixation holes 106 that secure to fasteners 108 on the primary gear 80. The arm 62 can otherwise be fixedly attached to the primary gear 80. As such, the arm 62 is secured relative to the spring-biased primary shaft 78. The bracket 100 preferably tapers inward to be narrower than the plates 72 and 73 to keep the entire pivot assembly 60 narrow.

The pivot assembly 60 is shown with six spiral torsion spring: two adjacent primary springs 88 and four secondary springs 89 with two aligned with each primary spring 88. Each spring 88 and 89 may have another set of springs adjacent to them engaging, secured to the same shaft. Transferred though each shaft 78 and 79, the resilience of the spiral torsion springs are combined via the gear assembly 74. Thus, the power of a six-spring assembly is available in a narrow width, which is typical for two springs. Two adjacent sets of springs, the width of each may be ⅝ inch, is an example of an acceptable standard width to stay within the three inch envelope, but as readily apparent, a single wider set of springs or varying widths or numbers are within the principles of this disclosure. As shown, two sets of set-by-side springs provide some redundancy with each set providing greater power than a single spring. A large amount of torque can be generated through a relatively small amount of rotation.

Figure 4:
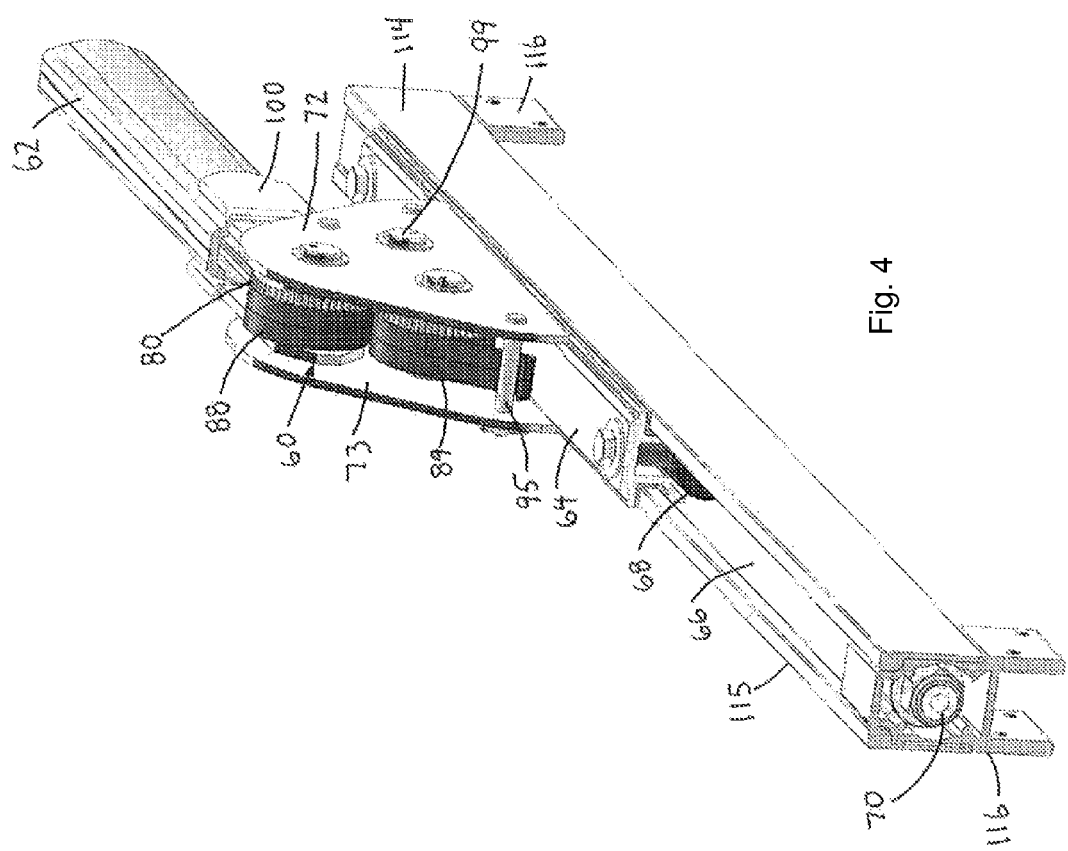
FIG. 4 shows a front quarter perspective view of a sliding pivot system.
Figure 5:
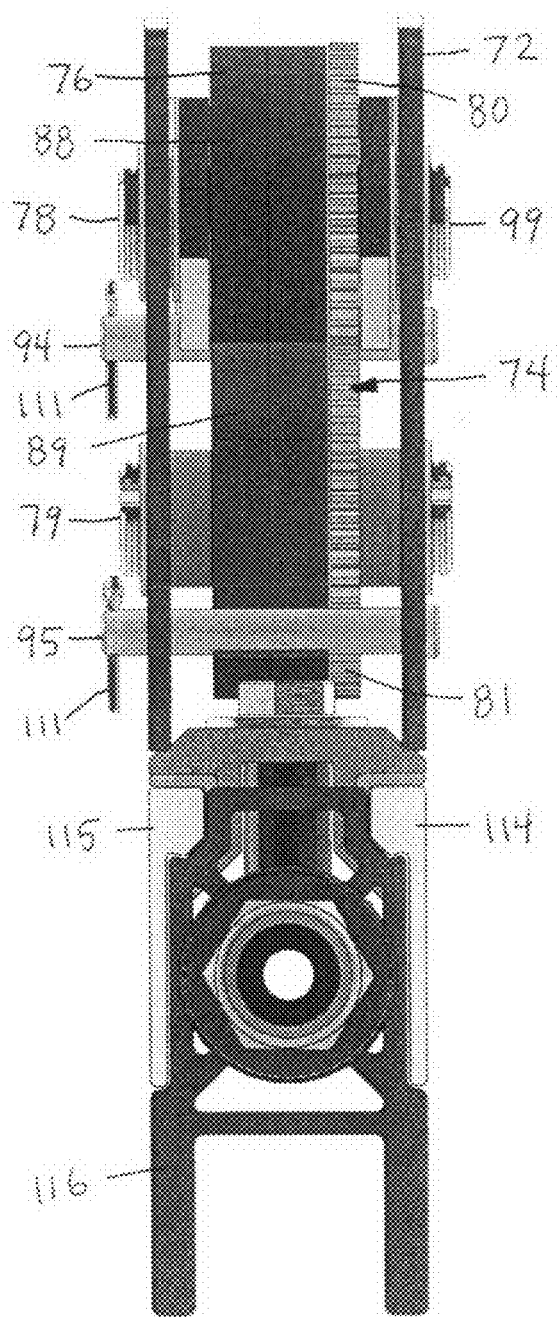
FIG. 5 shows a front view of a sliding pivot system.
Figure 6:
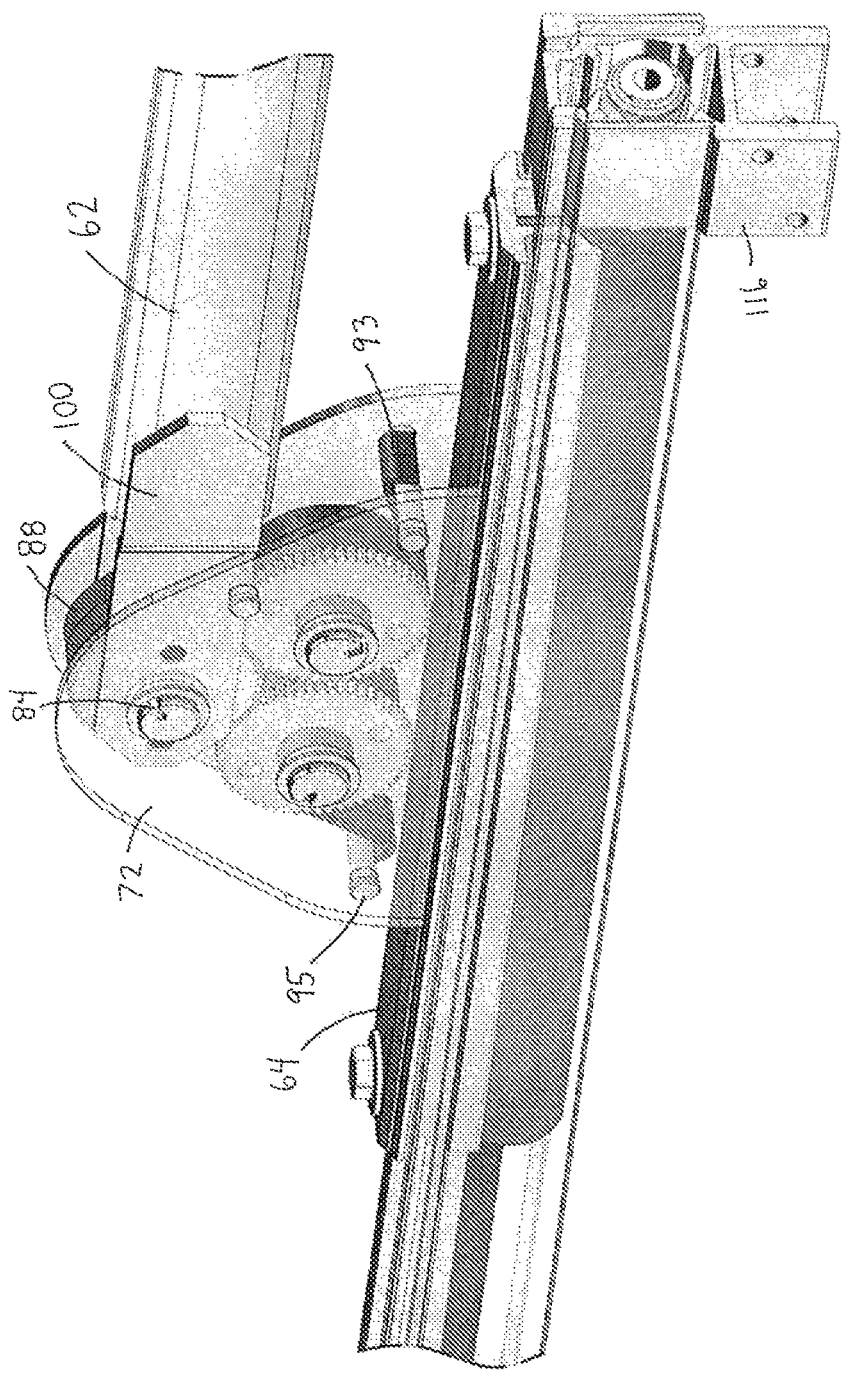
FIG. 6 shows a rear quarter perspective view of a sliding pivot system with a transparent plate.
Figure 7:
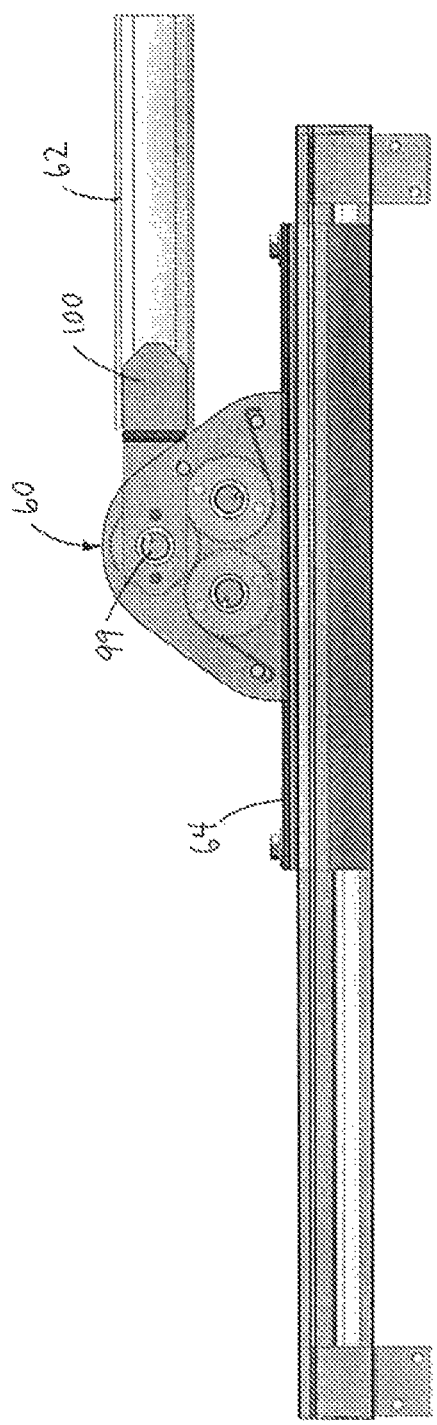
FIG. 7 shows a side view of a sliding pivot system with a transparent plate.
Figure 8:
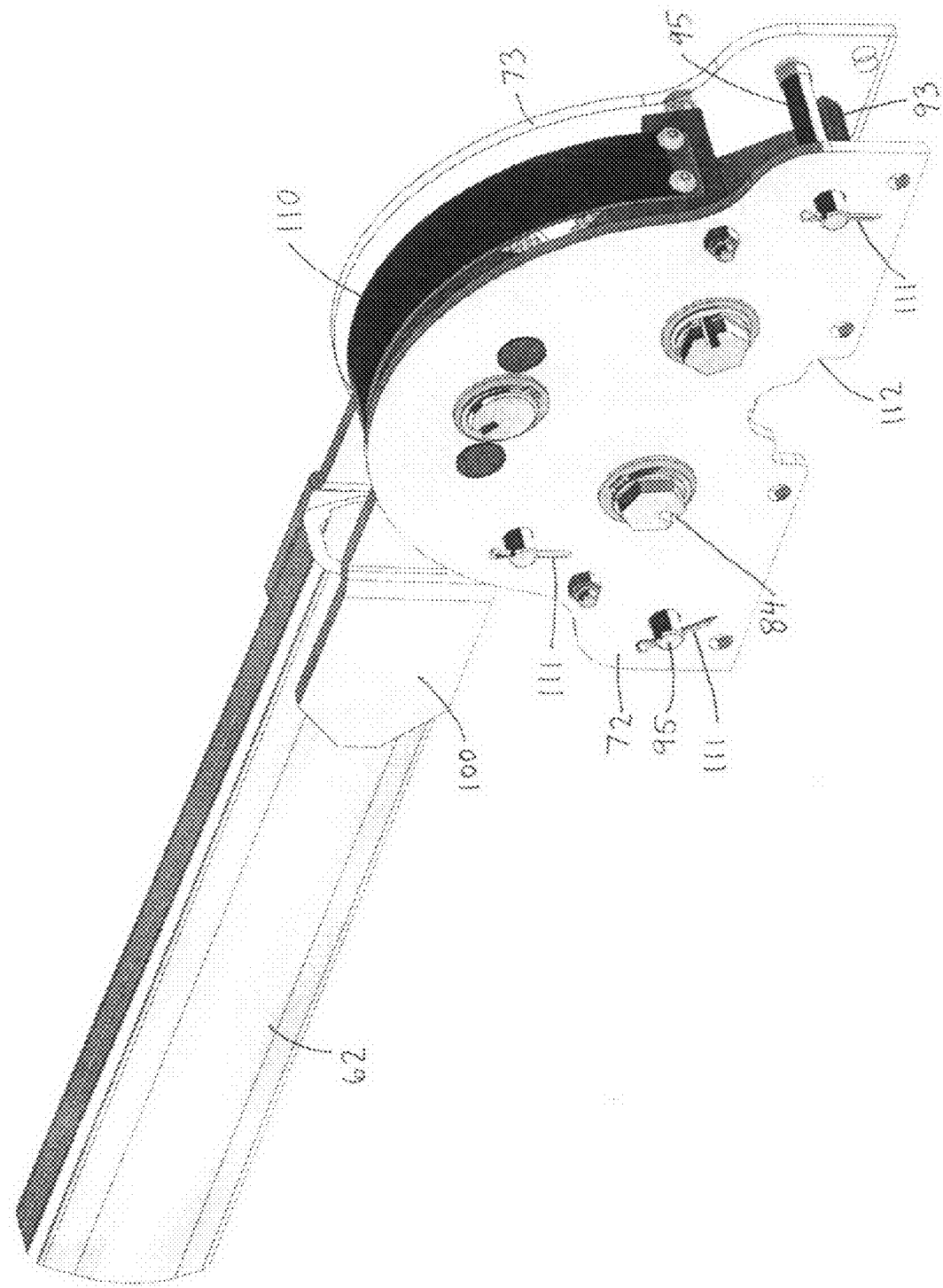
FIG. 8 shows a perspective back view of a pivot assembly with a spring cover.

FIG. 8 shows a backside of a pivot assembly 60 with a spring cover 110 to help keep debris out of the gear assembly 74 and the spring assembly 76. The spring cover 110 can be mounted between plates 72 and 73 along a top of the pivot assembly 60. The top of the plates 72 and 74 can be arcuate to accommodate a spring cover 110 that has a corresponding curve. Cotter pins 111 can be inserted into holes in the pins 94 and 95 to secure the pins, but pins remain removable. Also, an opening 112 at the base of each plates 72 and 74 can allow debris to pass through or pressurized water pass during cleaning. Similarly, the guide 66 may have an open bottom so that debris can pass through, such as with panels 114 and 115 with upper ridges to help secure the base 64 in tracks. As shown in FIGS. 4 and 6, the panels 114 and 115 may be held together with guide brackets 116 that may also help mount the combined sliding and pivoting assembly on or as a two-and-a-half inch square tube to each side of a truck. Thus, the pivot system 60 is low maintenance and easy to use and service.

Figure 9:
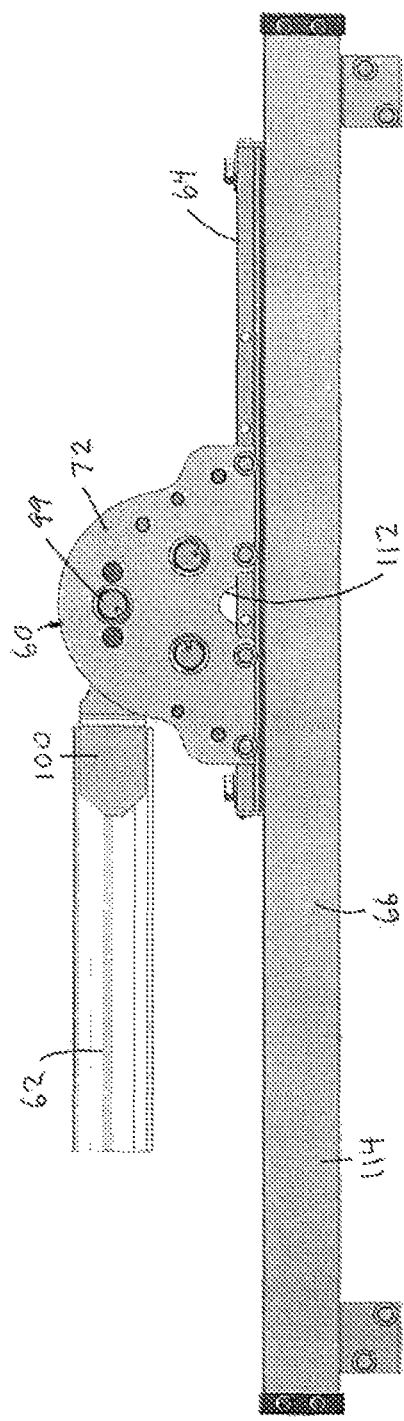
FIG. 9 shows a side view of a sliding pivot system with the arm fully rotated.

FIG. 9 shows a driver's side sliding pivot system in a rearward position on the guide 66 with the arm 62 fully rotated in one direction, and FIG. 10 shows the driver's side sliding pivot system slid to the aft position on the guide 66 with the arm 62 fully rotated in the opposite direction in a forward position. As an example, this shows 20 inches of aft adjustment and 180 degrees of aim rotation in a versatile sliding pivot system that is well suited for automated covering systems for use with different heights of detachable containers on a truck or vehicle.

As shown, the shafts 78 and 79 are mounted on the plates 72 and 73 oriented in a triangle, which functions well with three interconnected gears 80 and 81 of the gear assembly 74. The shafts 78 and 79 in a triangle allow each gear to transmit torque to the other two gears.

To increase the range of movement of the arm 62, a portion of the arm bracket 100 may be removed where the primary pin 94 would limit movement wherein the arm bracket 100 would strike the primary pin 94 at the extent of its range of pivoting.

The pivot assembly is relatively light, such as less than 95 pounds per side. This is approximately one third less weight than a rack and pinion system.

The gear assembly 74 being the width of one gear and the spring assembly 76 with sets of spring 88 and 89 aligned within the width of one spring allow for the pivot assembly 60 to be narrow with the power of multiple springs. A gear-driven pivot assembly can get maximum spring power from aligned springs 88 and 89 of a spring assembly 76 in a narrow width.

This disclosure has been described as having exemplary embodiments and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such variations from the present disclosure that come within the known or customary practice within the art to which it pertains.

What is claimed is:

1. Intended for use with an open-top container of a trailer or a rail car, a covering system with a cover movable between an opened position and a closed position, the covering system having a narrow pivot assembly comprising a gear assembly and a coordinated spring assembly between substantially flat plates with
    a first gear and a first spring of the spring assembly engaging a primary rotating shaft for coordinated movement;
    a secondary gear and a second spring engaging a second rotating shaft for coordinated movement; wherein the first gear transmits torque to the secondary gear as part of the gear assembly and the spring assembly provides torque to the first and secondary gears; and
    an arm fixedly attached to the first gear for pivoting about the primary rotating shaft.

2. The system of claim 1 wherein the narrow pivot assembly is less than three inches wide.

3. The system of claim 1 wherein the narrow pivot assembly is mounted on a sliding mechanism to be a sliding pivot assembly.

4. The system of claim 1 wherein the gear assembly transmits torque from the primary rotating shaft to the second rotating shaft by direct contact of teeth of the first and secondary gears.

5. The system of claim 1 wherein a primary spiral torsion spring has an inner hook secured to the primary rotating shaft adjacent to the first spring as side-by-side spiral torsion springs, each providing torque based on the power of multiple aligned second springs.

6. The system of claim 1 wherein the first spring and the second spring are spiral torsion springs with inner hook secured to the respective rotating shafts upon which the first and second springs are mounted and with outer hooks cooperating with to pins fixed relative to the plates.

7. The system of claim 1 further comprising a third gear and a third spring engaging a third rotating shaft for coordinated movement.

8. The system of claim 7 wherein the rotating shafts are mounted on the plates in a triangle so the first gear transmits torque to the other gears.

9. The system of claim 1 wherein the arm has a bracket including an aperture through which the primary rotating shaft passes and fixation holes that secure to fasteners on the first gear to secure the arm relative to the primary rotating shaft.

10. A covering system comprising a cover, a movable arm, and a pivot assembly for pivotably moving the movable arm, the pivot assembly including:
- a housing;
- a first rotating shaft with an axial groove, a primary gear with an inner tab engaging the axial groove, a primary spiral torsion spring with an inner hook secured in the axial groove, the movable arm secured relative to the primary gear and pivoting about the first rotating shaft; and
- a second rotating shaft with a groove, a secondary gear with a tab engaging the groove, a second spiral torsion spring with an inner hook secured in the groove;
- wherein direct contact of teeth of the primary and secondary gears transmit torque produced by the primary and secondary relative to the movable arm with the power of multiple aligned spiral torsion springs to pivot the movable arm relative to the housing.

11. The covering system of claim 10 additionally including a third rotating shaft with a third groove; a third gear with a third tab in the third groove; a third spiral torsion spring with a third inner hook secured in the third groove; wherein the third gear transmits torque to the primary gear.

12. The covering system of claim 10 further comprising a curved spring cover mounted between plates along a top of the pivot assembly.

13. The covering system of claim 10 wherein the movable arm is secured directly to the primary gear adjacent to the first rotating shaft.

14. The covering system of claim 10 wherein the primary spiral torsion spring has adjacent to it another spiral torsion spring that is secured to the first rotating shaft.

15. The covering system of claim 10 wherein the pivot assembly is between two plates of the housing through which the first and second rotating shafts pass and rotate relative to the plates, and outer hooks of the primary and second spiral torsion springs cooperate with pins fixed relative to the plates.

16. The covering system of claim 15 wherein the two plates are mounted on a base that is slideably mounted in a guide wherein the movable arm both slides and pivots relative to the guide.

17. The covering system of claim 10 including three gears and three springs on rotating shafts in a triangle so that the teeth of the primary gear meshes with teeth of the other two gears.

18. A gear-driven pivot assembly comprising a housing with a gear assembly cooperating with a spring assembly having power of aligned multiple springs with
- the gear assembly including a first and second toothed spring-biased gears that operably interact with one another, each engaging a respective shaft;
- the spring assembly including a plurality of aligned spiral torsion springs, each with an inner hook engaging the respective shaft and an outer hook cooperating with a respective pin fixed on the housing; and
- a pivot arm secured relative to one of the first and second toothed gears with the respective shaft as its pivot axis wherein the first and second toothed gears transmit torque generated by the spiral torsion springs to control movement of the pivot arm relative to the housing.

19. The gear-driven pivot assembly of claim 18 including three toothed gears and three spiral torsion springs with one toothed gear and one spiral torsion spring on respective shafts, the shafts mounted on the housing in a triangle so that one toothed gear meshes with the other two toothed gears.

20. The gear-driven pivot assembly of claim 18 wherein the housing is mounted on a sliding mechanism.

* * * * *

UNITED STATES PATENT AND TRADEMARK OFFICE
CERTIFICATE OF CORRECTION

PATENT NO. : 8,465,080 B2
APPLICATION NO. : 13/047285
DATED : June 18, 2013
INVENTOR(S) : Timothy K. Searfoss It is certified that error appears in the above-identified patent and that said Letters Patent is hereby corrected as shown below:

In the Claims:

In Claim 10, column 7, line 16, add the words "torsion springs" following the word "secondary".

Signed and Sealed this
Sixth Day of August, 2013

Teresa Stanek Rea
*Acting Director of the United States Patent and Trademark Office*